(12) United States Patent
Roychoudhury et al.

(10) Patent No.: US 8,491,008 B2
(45) Date of Patent: Jul. 23, 2013

(54) INJECTION MOLDED INFLATABLE ACTIVE BOLSTER

(75) Inventors: Raj S. Roychoudhury, Bloomfield Hills, MI (US); Stephen Hawkins, Ypsilanti, MI (US); Nicholas Herdegen, Franklin, MI (US); Dave Flajnik, Rochester, MI (US)

(73) Assignee: Salflex Polymers Ltd., Weston, Ontario (CA)

( * ) Notice: Subject to any disclaimer, the term of this patent is extended or adjusted under 35 U.S.C. 154(b) by 0 days.

(21) Appl. No.: 13/100,785

(22) Filed: May 4, 2011

(65) Prior Publication Data

US 2011/0272926 A1   Nov. 10, 2011

Related U.S. Application Data

(60) Provisional application No. 61/331,542, filed on May 5, 2010.

(51) Int. Cl.
*B60R 21/045* (2006.01)
(52) U.S. Cl.
USPC ..................................... 280/752; 296/187.06
(58) Field of Classification Search
USPC ................ 280/751–753; 296/187.05, 187.06
See application file for complete search history.

(56) References Cited

U.S. PATENT DOCUMENTS

| | | | |
|---|---|---|---|
| 2,834,606 A | 5/1958 | Bertrand | |
| 3,185,497 A | 5/1965 | Lagace | |
| 3,473,824 A | 10/1969 | Carey et al. | |
| 3,963,362 A | 6/1976 | Hollis | |
| 3,981,518 A | 9/1976 | Pulling | |
| 4,203,616 A | 5/1980 | Okada | |
| 4,297,051 A | 10/1981 | Robinson | |
| 4,362,425 A | 12/1982 | Dixon | |

(Continued)

FOREIGN PATENT DOCUMENTS

| | | |
|---|---|---|
| AT | 404746 | 2/1999 |
| DE | 1112266 | 8/1961 |

(Continued)

OTHER PUBLICATIONS

International Search Report and Written Opinion of the International Searching Authority, International Patent Application No. PCT/CA2011/000518, mailed Aug. 11, 2011.

(Continued)

*Primary Examiner* — Paul N Dickson
*Assistant Examiner* — Nicole Verley
(74) *Attorney, Agent, or Firm* — Michael Best & Friedrich LLP

(57) ABSTRACT

An inflatable active bolster for a vehicle occupant, the bolster having a first body section and a second body section interconnected by a living hinge. The first and second body sections are folded about the living hinge to form a hollow chamber. The first body section provides an outer surface for facing the vehicle occupant, while the second body section provides a support surface for coupling the inflatable active bolster to a vehicle. At least one of the first and second body sections provides at least one expansible element such that upon pressurization of the hollow chamber, at least a portion of the at least one expansible element undergoes deformation to permit inflation of the hollow chamber, thereby displacing the outer surface of the first body section outwardly to an extended position.

17 Claims, 14 Drawing Sheets

U.S. PATENT DOCUMENTS

| | | | |
|---|---|---|---|
| 4,511,281 | A | 4/1985 | Schmanski |
| 4,518,172 | A | 5/1985 | Bortz et al. |
| 4,597,691 | A | 7/1986 | Clarke |
| 4,721,329 | A | 1/1988 | Brantman et al. |
| 4,951,963 | A | 8/1990 | Behr et al. |
| 5,082,310 | A | 1/1992 | Bauer |
| 5,138,721 | A | 8/1992 | Spector |
| 5,273,309 | A | 12/1993 | Lau et al. |
| 5,312,133 | A * | 5/1994 | Pietila et al. .................. 280/752 |
| 5,324,070 | A | 6/1994 | Kitawage et al. |
| 5,324,072 | A | 6/1994 | Olson et al. |
| 5,364,125 | A | 11/1994 | Brown et al. |
| 5,370,417 | A | 12/1994 | Kelman et al. |
| 5,382,051 | A * | 1/1995 | Glance .......................... 280/751 |
| 5,447,326 | A | 9/1995 | Laske et al. |
| 5,456,490 | A | 10/1995 | Carter et al. |
| 5,476,283 | A | 12/1995 | Elton |
| 5,498,026 | A | 3/1996 | Eckhout |
| 5,524,924 | A | 6/1996 | Steffens, Jr. et al. |
| 5,533,748 | A | 7/1996 | Wirt et al. |
| 5,536,043 | A | 7/1996 | Lang et al. |
| 5,544,913 | A * | 8/1996 | Yamanishi et al. ......... 280/730.2 |
| 5,556,128 | A | 9/1996 | Sinnhuber et al. |
| 5,567,375 | A | 10/1996 | Filion et al. |
| 5,615,914 | A * | 4/1997 | Galbraith et al. .......... 280/743.1 |
| 5,630,621 | A | 5/1997 | Schneider |
| 5,716,093 | A | 2/1998 | Sadr |
| 5,718,449 | A * | 2/1998 | Numazawa et al. ....... 280/730.2 |
| 5,775,729 | A | 7/1998 | Schneider et al. |
| 5,816,613 | A | 10/1998 | Specht et al. |
| 5,845,937 | A | 12/1998 | Smith |
| 5,865,468 | A | 2/1999 | Hur |
| 5,927,755 | A | 7/1999 | Matsuo et al. |
| D412,880 | S | 8/1999 | Sadr |
| 5,931,493 | A | 8/1999 | Sutherland |
| 5,957,493 | A | 9/1999 | Larsen et al. |
| 5,967,594 | A * | 10/1999 | Ramanujam ................... 296/153 |
| 5,968,431 | A | 10/1999 | Ang et al. |
| 6,032,978 | A | 3/2000 | Spencer et al. |
| 6,131,950 | A | 10/2000 | Schroter |
| 6,142,520 | A | 11/2000 | Iino et al. |
| 6,158,766 | A | 12/2000 | Kowalski |
| 6,170,871 | B1 | 1/2001 | Goestenkors et al. |
| 6,193,272 | B1 | 2/2001 | Aigner et al. |
| 6,203,057 | B1 * | 3/2001 | Spencer et al. ............. 280/730.1 |
| 6,213,497 | B1 * | 4/2001 | Spencer et al. ............. 280/730.1 |
| 6,231,072 | B1 | 5/2001 | Pywell et al. |
| 6,250,665 | B1 | 6/2001 | Sutherland et al. |
| 6,302,437 | B1 | 10/2001 | Marriott et al. |
| 6,305,710 | B1 | 10/2001 | Bosgeitet et al. |
| 6,336,653 | B1 | 1/2002 | Yaniv et al. |
| 6,338,501 | B1 | 1/2002 | Heilig et al. |
| 6,416,079 | B1 | 7/2002 | Lutz et al. |
| 6,435,554 | B1 * | 8/2002 | Feldman .................... 280/743.2 |
| 6,471,242 | B2 | 10/2002 | Schneider |
| 6,517,103 | B1 | 2/2003 | Schneider |
| 6,536,802 | B1 | 3/2003 | Sutherland et al. |
| 6,543,838 | B1 * | 4/2003 | Bertolini et al. ............ 296/146.1 |
| 6,568,743 | B1 | 5/2003 | Jayasuriya et al. |
| 6,578,867 | B2 * | 6/2003 | Khoudari et al. .......... 280/730.1 |
| 6,588,557 | B2 | 7/2003 | Williams et al. |
| 6,619,689 | B2 * | 9/2003 | Spencer et al. ............. 280/730.1 |
| 6,688,643 | B2 | 2/2004 | Schneider |
| 6,712,385 | B2 * | 3/2004 | Enders ....................... 280/730.1 |
| 6,715,789 | B2 | 4/2004 | Takimoto et al. |
| 6,752,417 | B2 | 6/2004 | Takimoto et al. |
| 6,758,493 | B2 * | 7/2004 | Conlee et al. .................. 280/753 |
| 6,817,625 | B2 | 11/2004 | Hjerpe |
| 6,817,627 | B2 * | 11/2004 | Galmiche et al. .......... 280/730.1 |
| 6,848,715 | B2 * | 2/2005 | Nelson et al. ................... 280/753 |
| 6,874,811 | B2 | 4/2005 | Enders et al. |
| 6,971,667 | B2 * | 12/2005 | Enders et al. .............. 280/730.1 |
| 6,976,706 | B2 * | 12/2005 | Smith et al. .................... 280/753 |
| 6,991,252 | B2 | 1/2006 | Enders |
| 7,021,652 | B2 | 4/2006 | Kumagai et al. |
| 7,055,083 | B2 | 5/2006 | Wang |
| 7,055,853 | B2 | 6/2006 | Honda et al. |
| 7,086,663 | B2 | 8/2006 | Honda |
| 7,093,846 | B2 | 8/2006 | Reiter et al. |
| 7,093,851 | B2 | 8/2006 | Lotspih |
| 7,144,032 | B2 | 12/2006 | Lunt et al. |
| 7,168,733 | B2 | 1/2007 | Kumagai et al. |
| 7,213,840 | B2 | 5/2007 | Kumagai |
| 7,249,781 | B2 | 7/2007 | Kai et al. |
| 7,322,598 | B2 * | 1/2008 | Galmiche et al. ........... 280/730.1 |
| 7,350,852 | B2 * | 4/2008 | Rust et al. ................ 296/187.06 |
| 7,367,587 | B2 * | 5/2008 | Taoka ........................... 280/751 |
| 7,393,013 | B2 | 7/2008 | Best et al. |
| 7,396,040 | B2 | 7/2008 | Enders et al. |
| 7,413,215 | B2 | 8/2008 | Wetson et al. |
| 7,422,234 | B2 | 9/2008 | Huber et al. |
| 7,448,645 | B2 | 11/2008 | Bederka et al. |
| 7,481,457 | B2 * | 1/2009 | Best et al. ...................... 280/752 |
| 7,568,722 | B2 | 8/2009 | Sato et al. |
| 7,578,518 | B2 | 8/2009 | Ochiai et al. |
| 7,735,865 | B2 | 6/2010 | Cappabianca et al. |
| 7,874,587 | B2 | 1/2011 | Miki et al. |
| 7,980,589 | B2 * | 7/2011 | Best et al. .................. 280/730.1 |
| 8,146,943 | B2 | 4/2012 | Fukawatase et al. |
| 2001/0054811 | A1 | 12/2001 | Spencer et al. |
| 2002/0125691 | A1 | 9/2002 | Conlee et al. |
| 2002/0171231 | A1 | 11/2002 | Roychoudhury et al. |
| 2003/0127819 | A1 | 7/2003 | Richardson |
| 2003/0197354 | A1 | 10/2003 | Beland et al. |
| 2004/0007856 | A1 | 1/2004 | Enders et al. |
| 2004/0075251 | A1 | 4/2004 | Fuji et al. |
| 2004/0075252 | A1 | 4/2004 | Pan |
| 2004/0099644 | A1 | 5/2004 | Allen |
| 2004/0100075 | A1 | 5/2004 | Sakai et al. |
| 2004/0135353 | A1 | 7/2004 | Enders et al. |
| 2004/0145163 | A1 | 7/2004 | Galmiche et al. |
| 2004/0155447 | A1 | 8/2004 | Smith et al. |
| 2004/0163872 | A1 | 8/2004 | Lincoln et al. |
| 2004/0163873 | A1 | 8/2004 | Polz et al. |
| 2004/0178616 | A1 | 9/2004 | Yoshikawa |
| 2004/0232666 | A1 | 11/2004 | Sato et al. |
| 2005/0023802 | A1 | 2/2005 | Enders et al. |
| 2005/0029781 | A1 | 2/2005 | Enders et al. |
| 2005/0052005 | A1 | 3/2005 | Lunt et al. |
| 2005/0052010 | A1 | 3/2005 | Best et al. |
| 2005/0052011 | A1 | 3/2005 | Best et al. |
| 2005/0057024 | A1 | 3/2005 | Weston et al. |
| 2005/0073134 | A1 | 4/2005 | Matsuura et al. |
| 2005/0098996 | A1 | 5/2005 | Enders |
| 2005/0116449 | A1 | 6/2005 | Enders |
| 2005/0253369 | A1 | 11/2005 | Taoka |
| 2006/0214400 | A1 | 9/2006 | Enders et al. |
| 2007/0007753 | A1 | 1/2007 | Williams et al. |
| 2007/0052219 | A1 | 3/2007 | Rust et al. |
| 2007/0108746 | A1 | 5/2007 | Ochiai et al. |
| 2007/0108747 | A1 * | 5/2007 | Roychoudhury et al. .... 280/732 |
| 2007/0152431 | A1 | 7/2007 | Rust et al. |
| 2007/0273179 | A1 | 11/2007 | Hommel et al. |
| 2007/0296187 | A1 | 12/2007 | Ochiai |
| 2008/0061537 | A1 | 3/2008 | Enders |
| 2008/0203714 | A1 | 8/2008 | Untersinger et al. |
| 2009/0152848 | A1 | 6/2009 | Sadr et al. |
| 2009/0152849 | A1 | 6/2009 | Saraf et al. |
| 2009/0250915 | A1 | 10/2009 | Best et al. |
| 2010/0052296 | A1 | 3/2010 | Sasaki et al. |
| 2010/0194081 | A1 | 8/2010 | Thomas et al. |
| 2010/0320736 | A1 | 12/2010 | Traber et al. |
| 2010/0327566 | A1 | 12/2010 | Matsushima |
| 2011/0109064 | A1 | 5/2011 | Best et al. |
| 2011/0115201 | A1 | 5/2011 | Best et al. |
| 2011/0123739 | A1 | 5/2011 | Ciplijauskas et al. |
| 2011/0133435 | A1 | 6/2011 | Sadr et al. |
| 2011/0156378 | A1 | 6/2011 | Matsushima et al. |
| 2011/0198827 | A1 | 8/2011 | Roychoudhury |
| 2012/0080871 | A1 | 4/2012 | Roychoudhury |

FOREIGN PATENT DOCUMENTS

| | | |
|---|---|---|
| DE | 3737081 | 5/1989 |
| DE | 19546143 | 6/1997 |
| DE | 19858520 | 4/2000 |
| DE | 10123207 | 7/2002 |
| EP | 274535 | 7/1988 |

| | | |
|---|---|---|
| EP | 0678425 | 10/1995 |
| EP | 0684164 | 11/1995 |
| EP | 0872390 | 10/1998 |
| EP | 1426249 | 6/2004 |
| EP | 1663725 | 12/2009 |
| GB | 2272670 | 5/1994 |
| JP | 57058532 | 4/1982 |
| JP | 63-002741 | 1/1988 |
| JP | 63207744 | 8/1988 |
| JP | 282946 | 6/1990 |
| JP | 2249740 | 10/1990 |
| JP | 5016758 | 1/1993 |
| JP | 06-037011 | 5/1994 |
| JP | 7291084 | 11/1995 |
| JP | H08-258604 | 10/1996 |
| JP | 10504784 | 5/1998 |
| JP | 10512210 | 11/1998 |
| JP | H11-028998 | 2/1999 |
| JP | 11-091454 | 4/1999 |
| JP | 11334515 | 12/1999 |
| JP | 2000006751 | 1/2000 |
| JP | 2000-326810 | 11/2000 |
| JP | 2002-522286 | 7/2002 |
| JP | 2003517966 | 6/2003 |
| JP | 2004026126 | 1/2004 |
| JP | 2004182231 | 7/2004 |
| JP | 2004249960 | 9/2004 |
| JP | 2004-338677 | 12/2004 |
| JP | 2007-504050 | 3/2007 |
| JP | 2007090954 | 4/2007 |
| JP | 4083653 | 4/2008 |
| JP | 4136876 | 8/2008 |
| WO | 00/07851 | 2/2000 |
| WO | 00/50270 | 8/2000 |
| WO | 2004/071818 | 8/2004 |
| WO | 2006/132990 | 12/2006 |
| WO | 2007/056849 | 5/2007 |
| WO | 2009/124394 | 10/2009 |
| WO | 2009/124395 | 10/2009 |
| WO | 2009/124401 | 10/2009 |

OTHER PUBLICATIONS

Anonymous "Inflatable Bellows-Box Panel" Research Disclosure, Mason Publications, Hampshire, Great Britain, vol. 374, No. 9 (Jun. 1, 1995).
Canadian Patent Application No. 2,535,661 Notice of Allowance dated Feb. 1, 2010.
Canadian Patent Application No. 2,535,661 Office Action dated Jan. 20, 2009.
European Patent Application No. 04761769.1 Examination Report dated Mar. 23, 2007.
European Patent Application No. 04761769.1 Communication under Rule 71 (3) EPC dated Jul. 1, 2009.
European Patent Application No. 04761769.1 Decision to Grant dated Nov. 19, 2009.
European Patent Application No. 04761769.1 Supplementary European Search Report dated Nov. 1, 2006.
European Patent Application No. 06771989.8 Supplementary European Search Report dated Feb. 8, 2010.
European Patent Application No. 06771989.8 Examination Report dated May 21, 2010.
European Patent Application No. 06804728.1 Communication under Rule 71 (3) EPC dated Jun. 14, 2010.
European Patent Application No. 06804728.1 Examination Report dated Oct. 27, 2009.
European Patent Application No. 06804728.1 Response to European Examination Report dated Mar. 3, 2010.
European Patent Application No. 06804728.1 Supplementary European Search Report dated Jun. 15, 2009.
International Patent Application No. PCT/CA2004/001605 International Search Report dated Feb. 8, 2005.
International Patent Application No. PCT/CA2006/001862 International Preliminary Report on Patentability dated May 29, 2008.
International Patent Application No. PCT/CA2006/001862 International Search Report and Written Opinion dated Feb. 1, 2007.
International Patent Application No. PCT/CA2009/000475 International Search Report dated Jul. 7, 2009.
International Patent Application No. PCT/CA2009/000476 International Search Report and Written Opinion dated Jul. 28, 2009.
International Patent Application No. PCT/CA2009/000507 International Search Report dated Jul. 14, 2009.
International Patent Application No. PCT/US2006/021507 International Search Report and Written Opinion dated Oct. 26, 2006.
International Patent Application No. PCT/US2006/021507 International Preliminary Report on Patentability dated Dec. 6, 2007.
Japanese Patent Application No. 2006-525586 Office Action dated Apr. 6, 2010.
European Patent Application No. 06771989.8 Examination Report dated Feb. 2, 2011.
Japanese Office Action for Application No. 2008-514914 dated Aug. 31, 2011, 6 pages.
English translation of DE10123207; Publication Date: Jul. 4, 2002; Country: DE; Inventar: Tietz Werner; Assignee: Audi NSU Auto Union AG.
German Patent Application No. 112009000827.5 Office Action dated Apr. 16, 2012 (English Translation and Original).
European Search Report for Application No. 12168676.0 dated Jun. 26, 2012.
Office Action from the Korean Intellectual Property Office for Application No. 10-2007-7030970 dated Jan. 17, 2013 (14 pages).
Office Action from the United States Patent and Trademark Office for U.S. Appl. No. 13/215,892 dated Apr. 16, 2013 (11 pages).

* cited by examiner

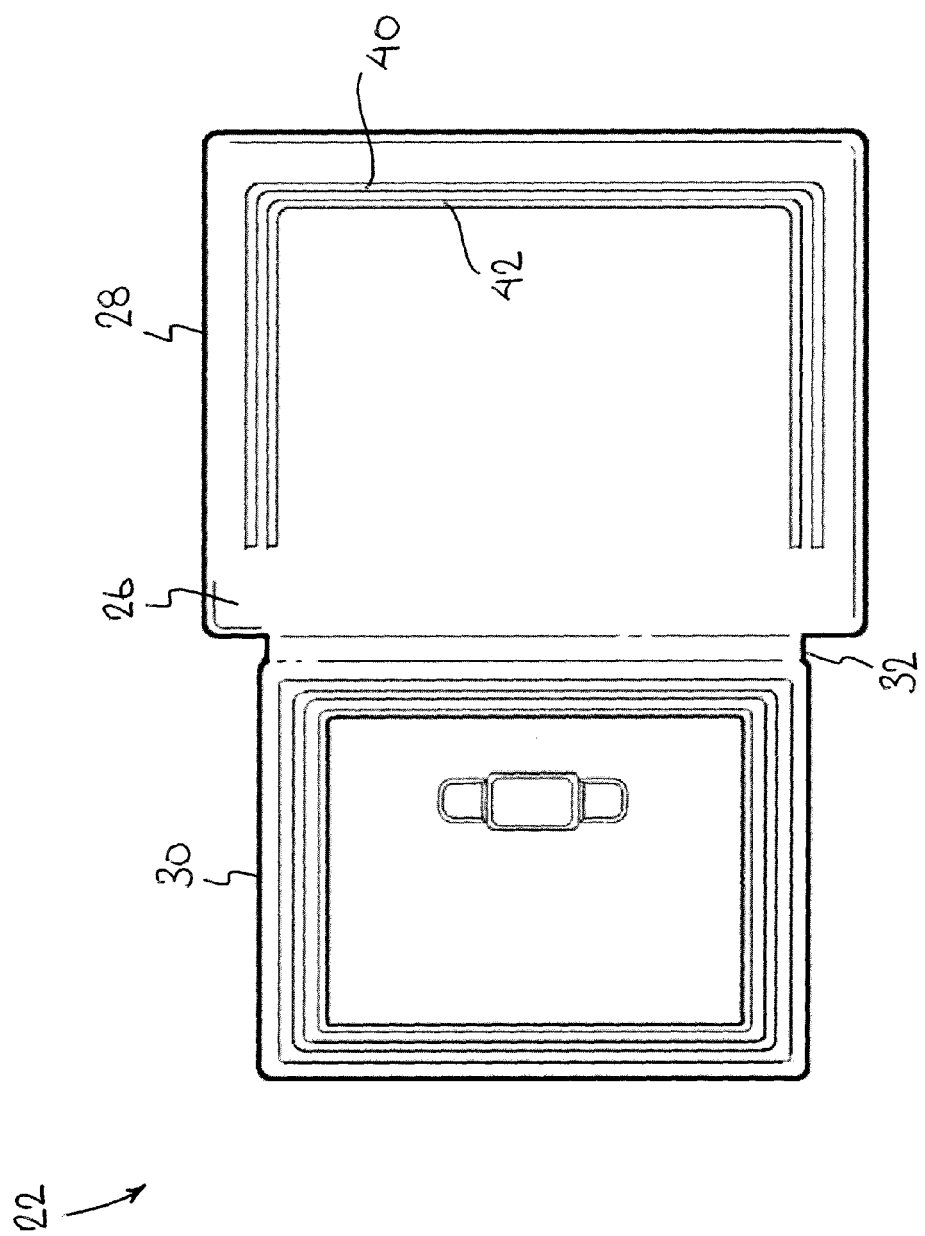

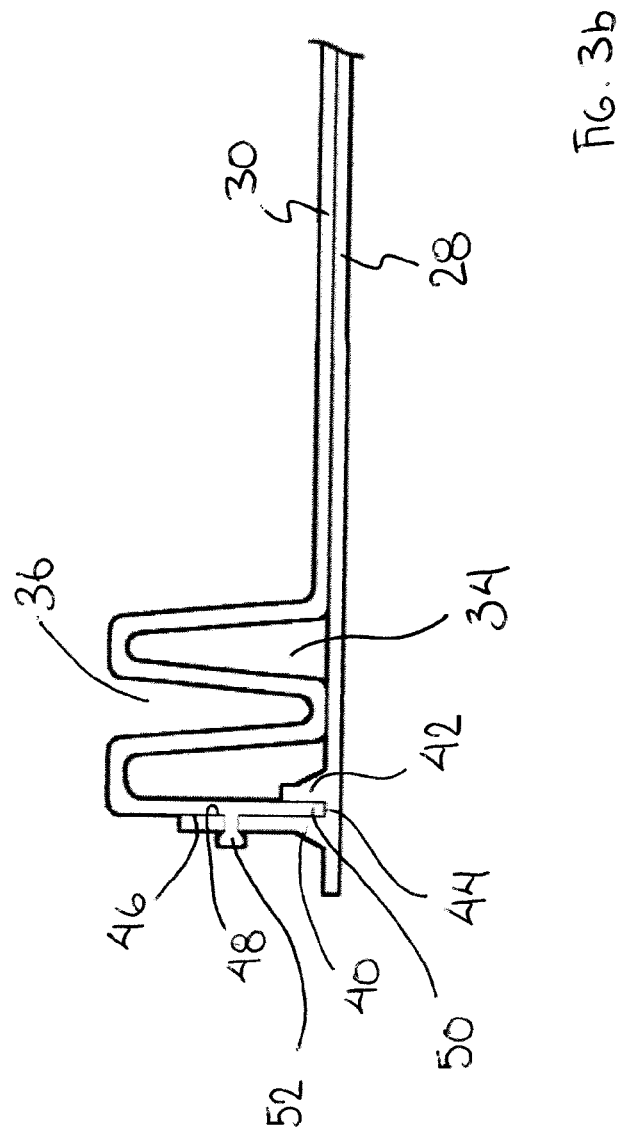

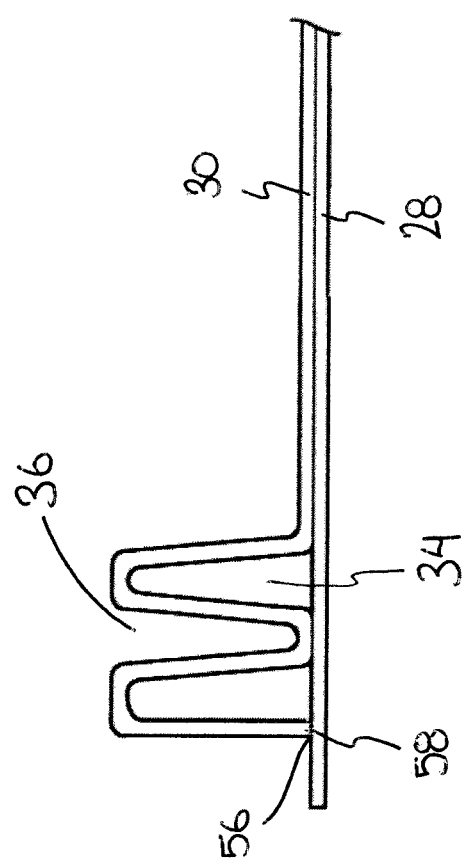

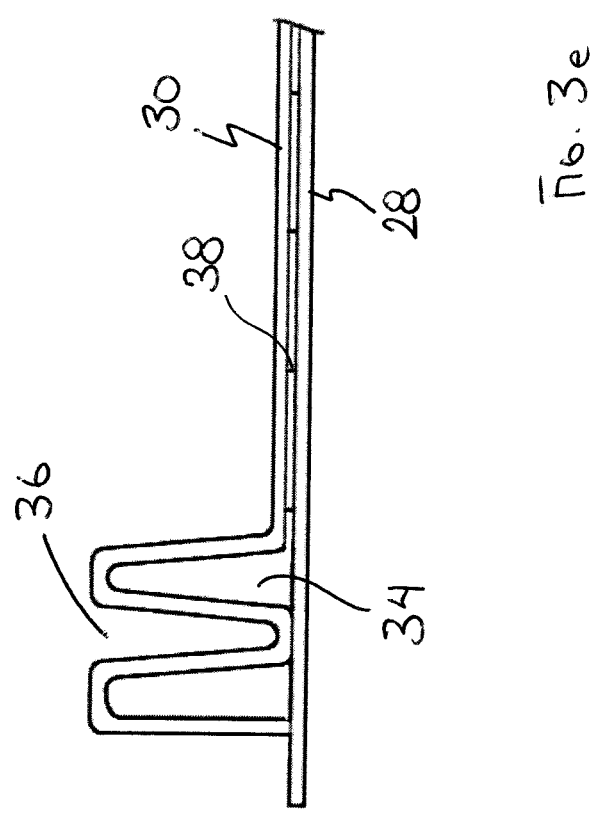

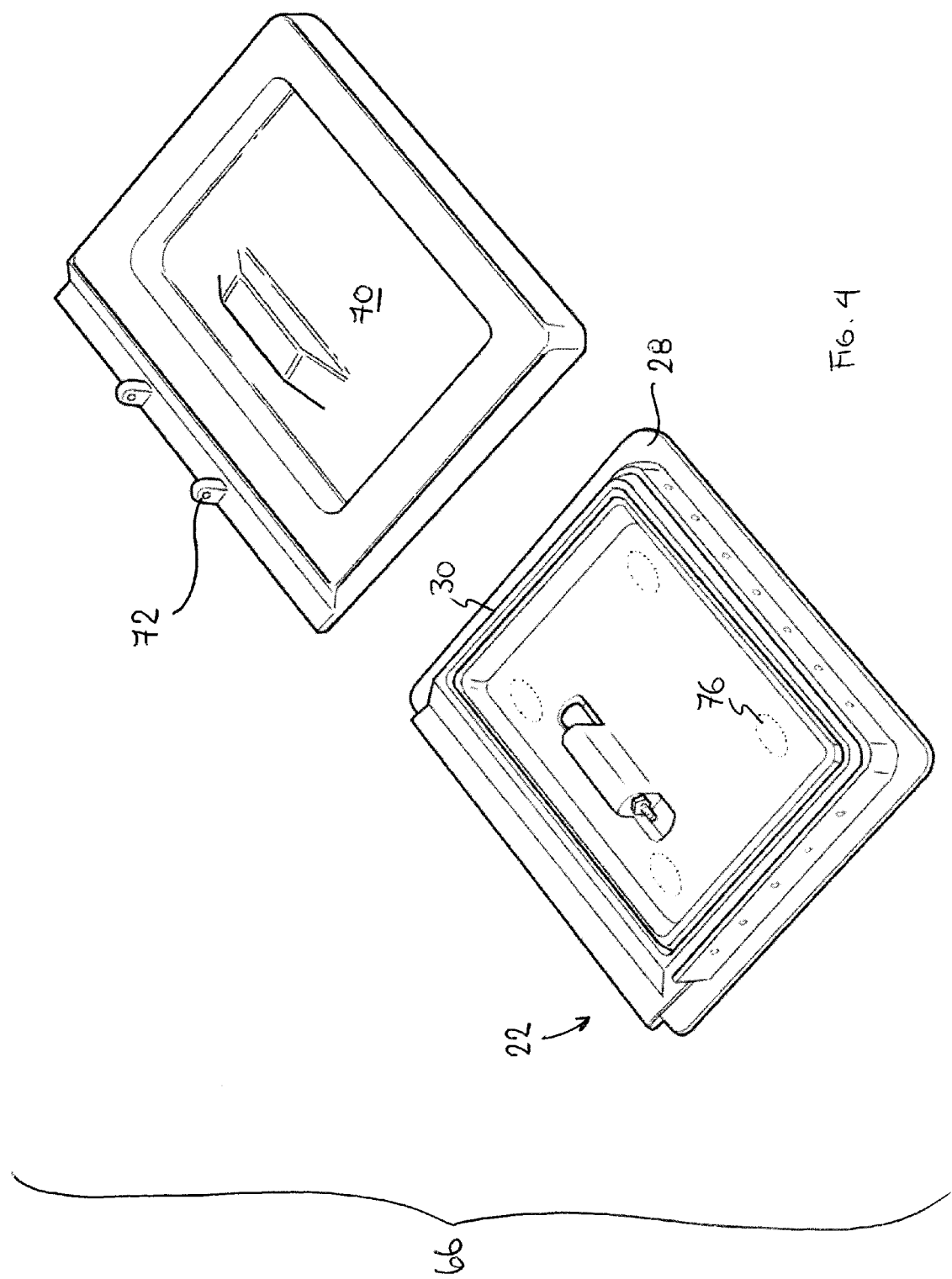

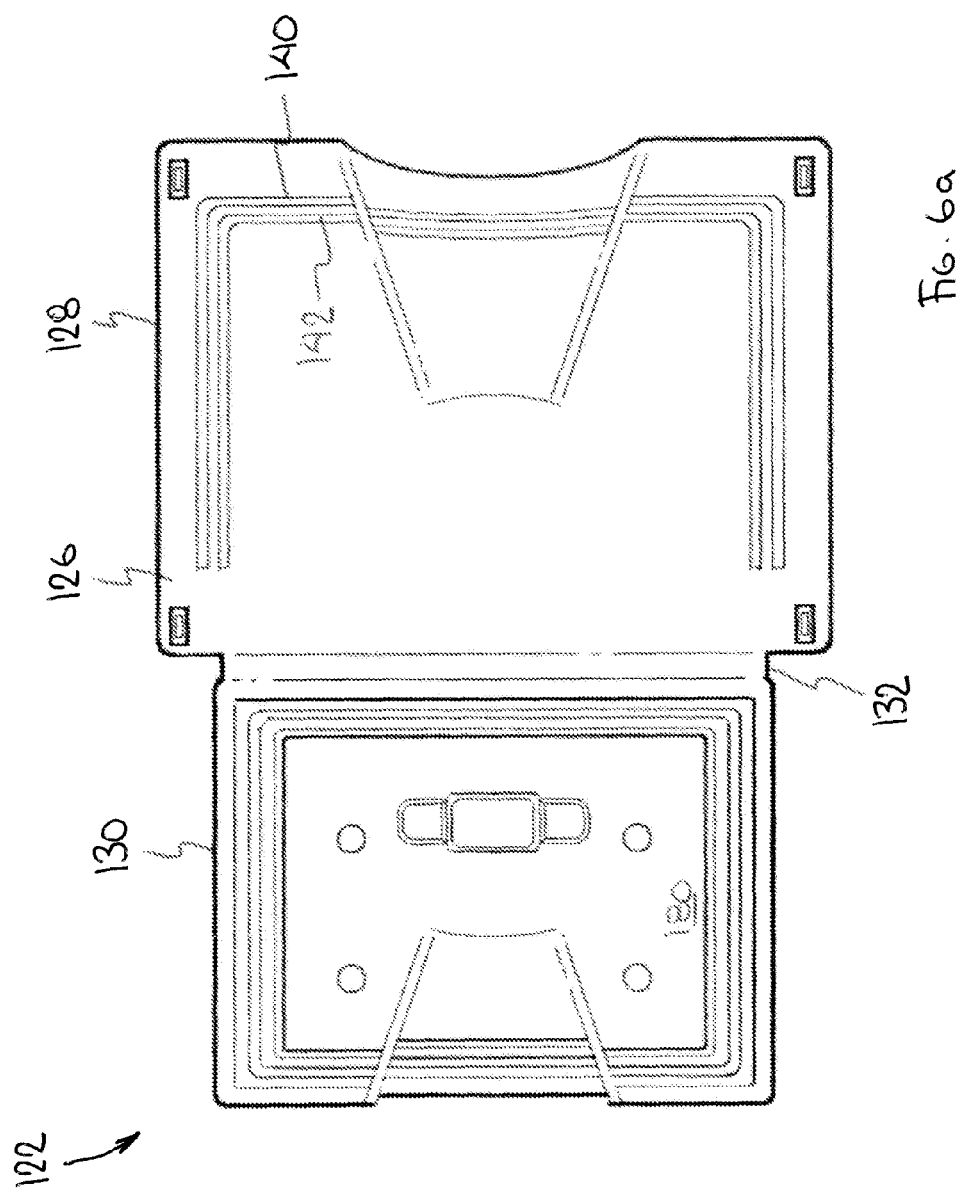

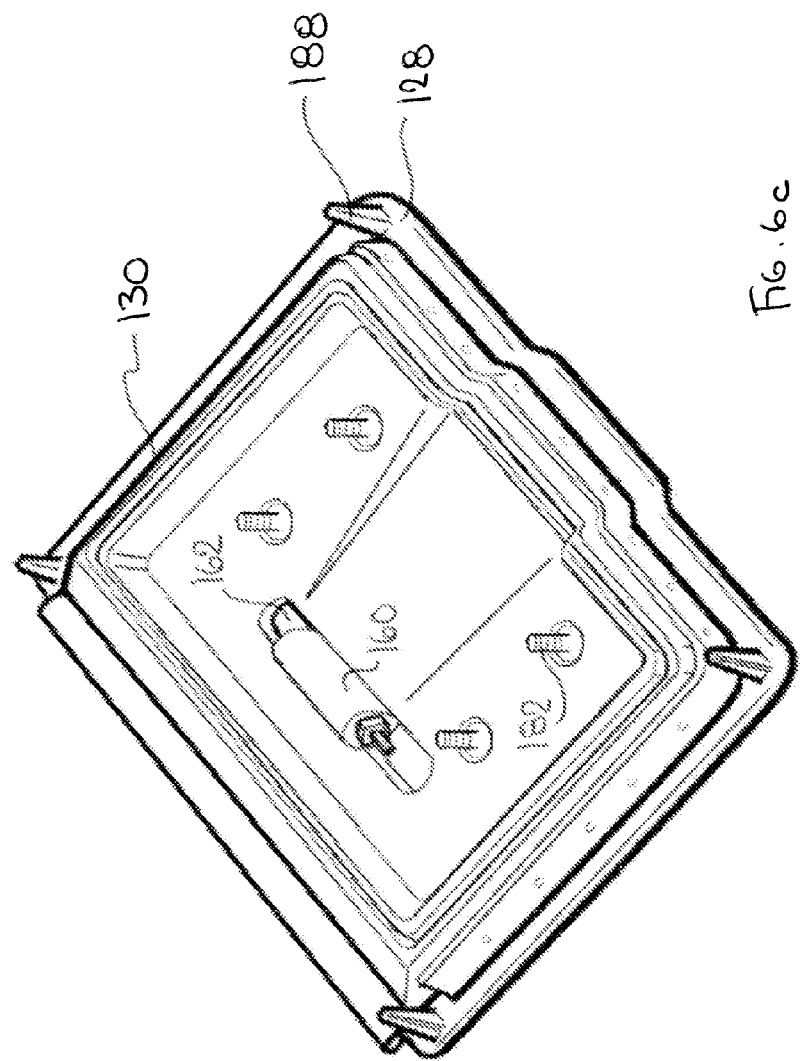

INJECTION MOLDED INFLATABLE ACTIVE BOLSTER

CROSS-REFERENCE TO RELATED APPLICATIONS

This application claims the benefit of and priority to U.S. Provisional Patent Application No. 61/331,542, filed May 5, 2010, the entire contents of which are hereby incorporated by reference herein.

FIELD OF THE INVENTION

The present invention relates to an energy management system for a crash impact event, and in particular to an injection molded inflatable active bolster.

BACKGROUND OF THE INVENTION

Inflatable bolsters have been developed to enhance vehicle occupant protection in the event of a vehicle crash. Such bolsters are mounted within a vehicle compartment and include a hollow body and an inflator for injecting a pressurized fluid into the hollow body. In order to reduce the potential for injuries from impacting the vehicle interior, the inflator is activated upon detection of such an event, and the bolster is inflated to form a cushion.

One prior active bolster comprises a polymeric expansible body having a face portion towards a vehicle occupant and a back portion in opposing relation. The expansible body is connected to an inflator such that upon discharge of a gas, the face portion is projected outwardly to an extended position, so as to intercept and cushion the impacting portion of the occupant. At the core of such bolsters is generally a blow molded expansible hollow structure, much like that detailed Applicant's U.S. Pat. No. 6,203,057.

While such a construction may provide a desired degree of protection, interior space restrictions and the need to meet interior design flexibility and fit/finish necessitates further options in respect of active bolster technology.

SUMMARY OF THE INVENTION

According to an aspect of an embodiment provided is an inflatable active bolster for a vehicle occupant, the inflatable active bolster comprising an expansible hollow chamber of unitary construction having a first body section and a second body section interconnected by a living hinge, the first and second body sections being folded about the living hinge and joined about at least a portion of the periphery between the first and second body section to form the hollow chamber. The first body section provides an outer surface for facing the vehicle occupant, while the second body section provides a support surface for coupling the inflatable active bolster to a vehicle. At least one of the first and second body sections provides at least one expansible element such that upon pressurization of the expansible hollow chamber, at least a portion of the at least one expansible element undergoes deformation to permit inflation of the expansible hollow chamber, thereby displacing the outer surface of the first body section outwardly to an extended position.

According to another aspect of an embodiment, provided is an injection molded inflatable active bolster for a vehicle occupant that projects outwardly from a stored position to an extended position adjacent the occupant during a collision event. The bolster comprises an expansible hollow chamber of unitary injection molded construction having a first body section and a second body section interconnected by a living hinge. The first and second body sections are folded about the living hinge and joined about at least a portion of the remaining periphery between the first and second body section, to form the hollow chamber. The first body section presents an outer surface for facing the vehicle occupant, while the second body section provides a mating surface for attachment of the inflatable active bolster to a vehicle. Also provided is an inflator in fluid communication with the expansible hollow chamber, the second body section having at least one expansible element such that upon pressurization of the expansible hollow chamber by the inflator, at least a portion of the at least one expansible element undergoes deformation to permit inflation of the expansible hollow chamber, displacing the outer surface of the first body section outwardly to an extended position.

BRIEF DESCRIPTION OF THE DRAWINGS

The foregoing and other features and advantages of the invention will be apparent from the following description of the invention as illustrated in the accompanying drawings. The accompanying drawings, which are incorporated herein and form a part of the specification, further serve to explain the principles of the invention and to enable a person skilled in the pertinent art to make and use the invention. The drawings are not to scale.

FIG. 2 is a plan view (interior side) of expansible body of the active bolster system in an unfolded state, according to one exemplary embodiment.

FIG. 3b is a side sectional view of the active bolster system of FIG. 3a, as indicated by sectional lines A-A.

FIG. 3d is a side sectional view of an alternate embodiment detailing the attachment of first body section to second body section.

FIG. 3e is a side sectional view of a further alternate embodiment in which a set spacing is provided between first body section and second body section.

FIG. 4 is an exploded perspective view of the active bolster system of FIG. 3a with an additional finished panel.

FIG. 6a is a plan view (interior side) of the expansible body of the active bolster system in an unfolded state, according to another exemplary embodiment.

FIG. 6b is a perspective view of the active bolster system in a partially folded state, according to the embodiment of FIG. 6a.

FIG. 6c is a perspective view of the active bolster system in a folded/readied state, according to the embodiment of FIG. 6a.

DETAILED DESCRIPTION OF EMBODIMENTS OF THE PRESENT INVENTION

Specific embodiments of the present invention will now be described with reference to the figures. The following detailed description is merely exemplary in nature and is not intended to limit the invention or the application and uses of the invention. A person skilled in the relevant art will recognize that other configurations and arrangements can be used without departing from the scope of the invention. Although the description of the embodiments hereof is in the context of vehicular active bolsters, the invention may also be used in other active bolster arrangements. Furthermore, there is no intention to be bound by any expressed or implied theory presented in the preceding technical field, background, brief summary or the following detailed description.

Figure 1:
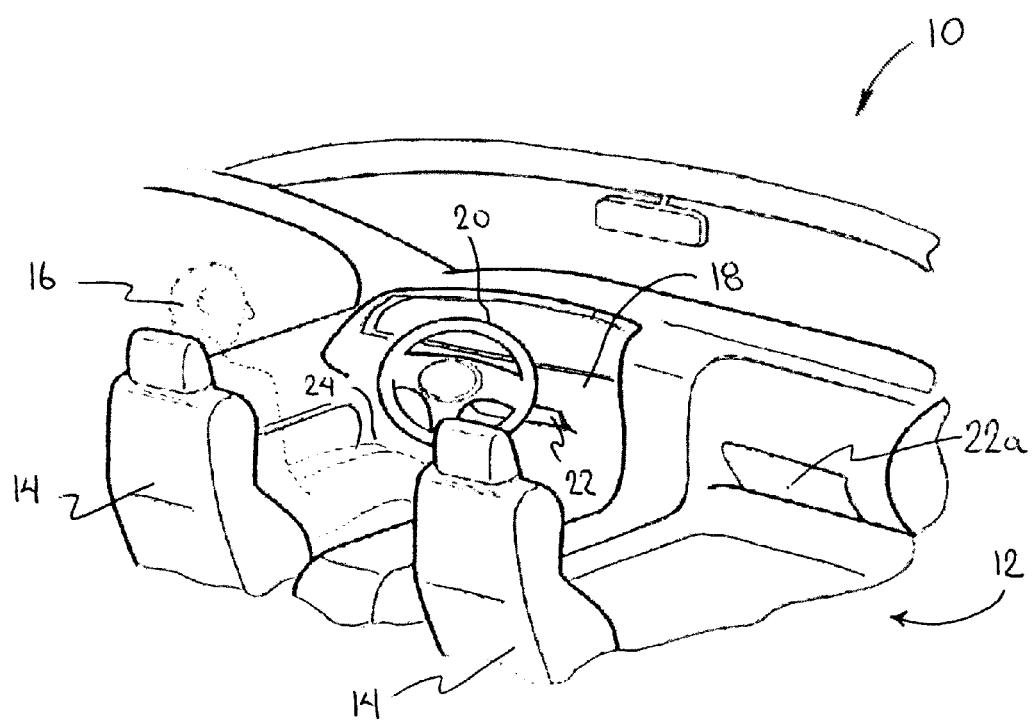
FIG. 1 is a perspective view of an active bolster system in a vehicle in its unexpanded state according to one exemplary embodiment.

Referring to FIG. 1, an automotive vehicle 10 has a passenger compartment 12 that includes front seats 14 for the occupants, including a driver 16. The usual instrument panel 18 flanks the steering wheel 20. An active bolster 22 is mounted on the underside of instrument panel 18 adjacent the knees 24 of driver 16. A similar arrangement is provided for the passenger, for example as shown at 22a. In a non-expanded state, active bolster 22 is nearly flush with the underside of instrument panel 18. Upon activation, a portion of active bolster 22 expands (i.e. moves distally) away from instrument panel 18 to absorb kinetic energy from a moving object, such as an occupant of the vehicle. For example, activation/deployment may occur upon the detection of a deceleration event (i.e. front impact) or a sudden acceleration event (rear impact). Sensors (not shown), such as accelerometers, are provided for vehicle 10 to detect such a change in acceleration. An electronic control unit (ECU), computer or processor, or other means is provided to receive and interpret the signals from the sensors and provide a control signal to initiate the deployment of active bolster 22. The ECU may also receive and process signals from other safety related sensors such as, for example, occupant sensors, crash sensors (e.g. magnetic and/or acceleration), pre-crash sensors (e.g. radar and/or vision sensors). The ECU may also be configured to perform occupant classification and crash detection determinations in order to determine whether to initiate, modify or suppress activation of the bolster.

Figure 3A:
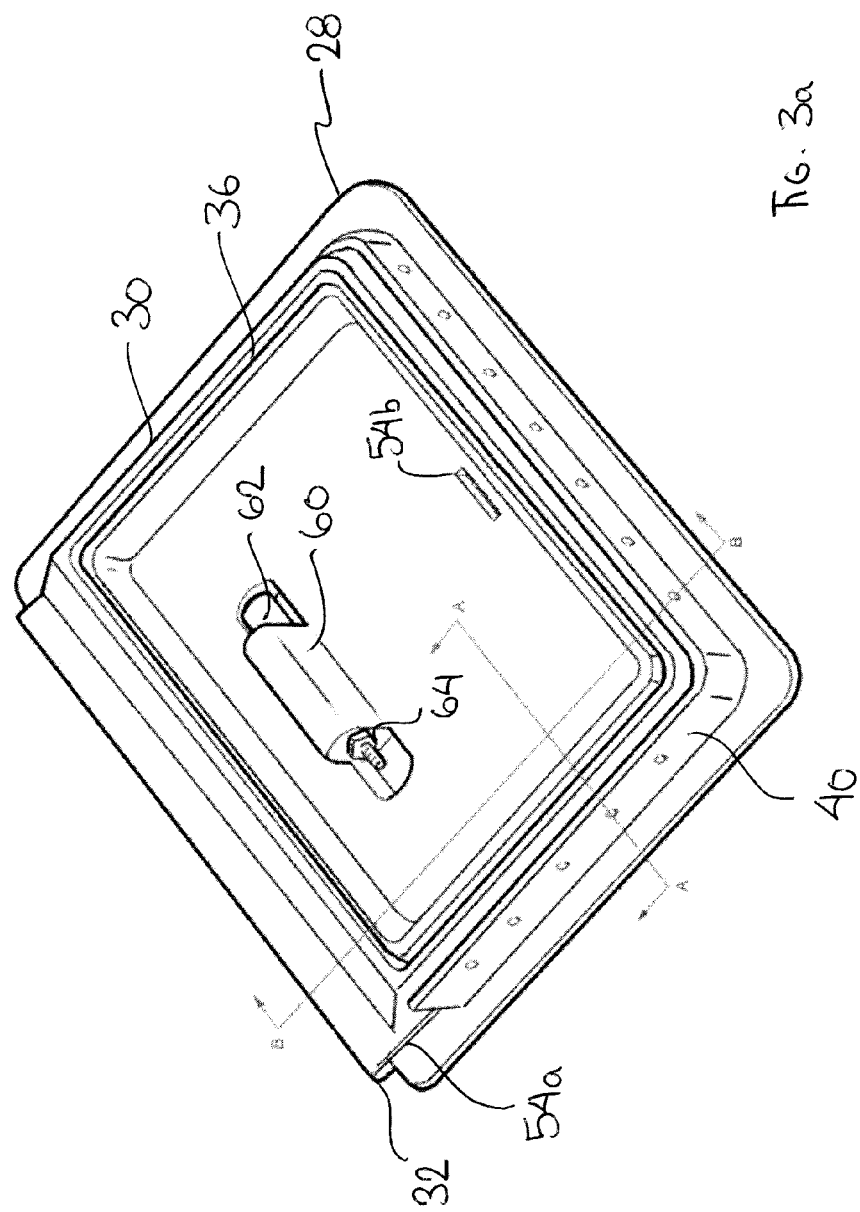
FIG. 3a is a perspective view of the active bolster system in a folded/readied state, according to the embodiment of FIG. 2.
Figure 3C:
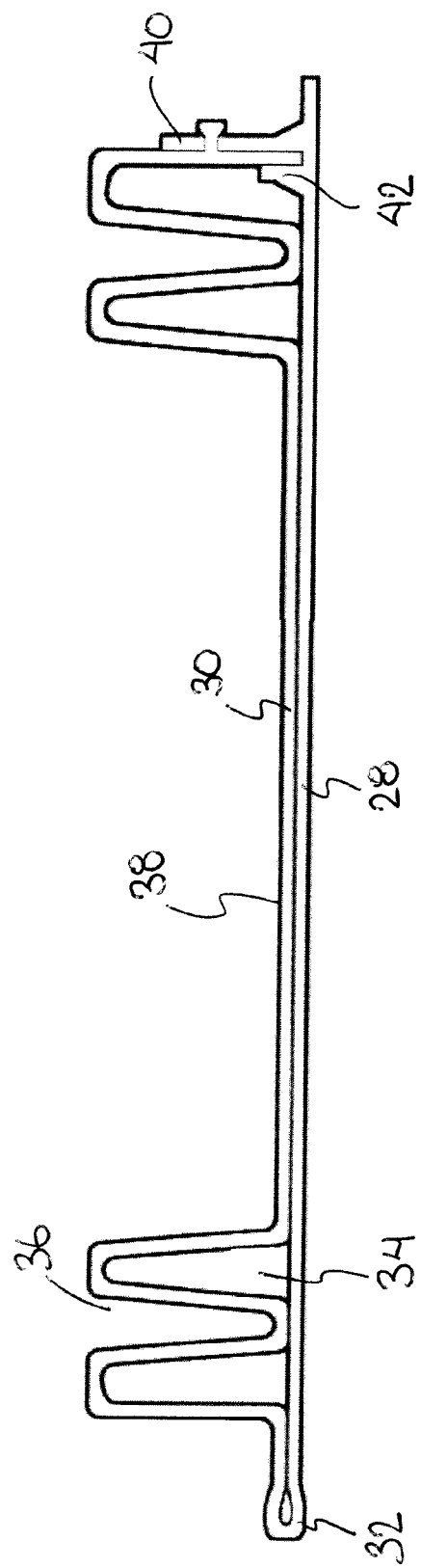
FIG. 3c is a side sectional view of the active bolster system of FIG. 3a, as indicated by sectional lines B-B.

Referring now to FIG. 2, active bolster 22 comprises an injection molded body 26 having a first body section 28 and a second body section 30, first and second body sections 28, 30 being interconnected through a living hinge 32. While shown as generally continuous, living hinge 32 may be discontinuous along its defined length. Active bolster 22 is injection molded using a suitable polymeric material, in substantially an open or flat configuration, for example as depicted in the plan view of FIG. 2. As first and second body sections 28, 30 are joined through living hinge 32, they are generally referred to as being of unitary construction. First body section 28 is foldable upon second body section 30 by way of living hinge 32, into a closed configuration representative of the assembled and readied state as shown in FIG. 3a. In this closed configuration, first and second body sections 28, 30 define an expansible hollow chamber 34 therebetween, as shown more clearly in FIGS. 3b and 3c. On deployment of active bolster 22 during a crash event, hollow chamber 34 undergoes volumetric expansion. To facilitate this, at least a portion of at least one of first and second body sections 28, 30 are provided with one or more pleats or operably similar expansible elements. In the embodiment detailed in FIGS. 3b and 3c, second body section 30 is provided with one inverted U-shaped accordion pleat 36 proximal about at least a portion of the periphery of second body section 30. To reduce the unexpanded or pre-deployment volume of hollow chamber 34, and to generally avoid unnecessary consumption of interior space, second body section 30 may also comprise a recessed mid-portion 38, providing active bolster 22 with a relatively low-profile cross-section, as shown for example in FIG. 3c. In the folded configuration, within the region of recessed mid-portion 38, interior surfaces of first and second body sections 28, 30 may be substantially adjacent, as shown in FIG. 3c, or in close proximity, as shown in FIG. 3e, so as to minimize the volume of hollow chamber 34. Where the first and second body sections 28, 30 are provided in close proximity, that is with a set spacing between inside surfaces, one or more frangible connections 39 may be provided to prevent movement of each body section relative to the other. One deployment, frangible connections 39 would break, thus permitting for volumetric expansion of hollow chamber 34. Regardless of the arrangement, the generally close spatial relationship between the inside surfaces of first and second body sections 28, 30 permits the use of a lower capacity inflator, thus saving on overall cost. In addition, this design serves to impart improved stiffness characteristics, wherein the bolster is more resistant to deforming under normal push loads.

As will be appreciated, the sealing arrangement between first and second body sections 28, 30 may be accomplished a variety of ways. For example, one or both of first and second body sections 28, 30 may provide one or more projection elements around at least a portion of each respective periphery to provide a bonding or joining surface to achieve a sealing arrangement therebetween. In the embodiment detailed for example in FIG. 3b, first body section 28 provides a first projection element 40 and a second projection element 42 extending from an inside surface proximal the outer perimeter opposite living hinge 32 and adjacent side sections, with a channel 44 being formed therebetween. In folding first and second body sections 28, 30 into the closed configuration, an outside surface 46 of second body section 30 closely aligns with an inside surface 48 of first projection element 40, with a peripheral region 50 of second body section 30 being received in channel 44, thereby to form a sealing arrangement therebetween. To maintain this sealing arrangement first and second body sections 28, 30 may be heat staked by way of one or more protrusions 52 provided on one or both of first and second projection elements 40, 42 and/or maintained in position using suitable welds or adhesives between adjoining surfaces. In the closed configuration, hollow chamber 34 is substantially air-tight, except for at least one vent segment 54a provided adjacent living hinge 32. As deemed necessary, additional vents 54b may be implemented, depending on the desired rate and extension of expansion of hollow chamber 34.

In an alternate embodiment, the sealing arrangement between first and second body sections 28, 30 may be accomplished by way of a weld seam 56 provided directly between the peripheral end surface 58 of second body section 30 and inside surface of first body section 28, as detailed in FIG. 3d. The weld seam may be continuous or discontinuous around at least a portion of the periphery or outer perimeter opposite living hinge 32 and the adjacent side sections. To facilitate the formation of a weld seam, the peripheral end surface of the second body section may be appropriately shaped (e.g. flared, L-shaped, etc.) to increase the available surface area for welding.

Referring back to FIG. 3a, an integral housing 60 is formed in second body section 30 and includes an opening for receiving an inflator 62 that is bolted at 64 to the second body section 30. Inflator 62 is releasably coupled directly to the second body section 30 so as to be in direct fluid communication with hollow chamber 34. Accordingly, in the event of an impact event, inflator 62 serves to pressurize body 26, in particular hollow chamber 34. Exemplary inflators include, but are not limited to cold gas, hybrid and pyrotechnic inflators. In other exemplary embodiments, the inflator is incorporated in different manners including, but not limited to, different coupling arrangements (e.g. permanent, clamps, other fasteners, interference fit, or pressure seals), remote fluid communication (e.g. a tube or channel interposed between the inflator 62 and the hollow chamber 34), or housing arrangements.

Where active bolster 22 is implemented in an operable feature of a vehicle, such as for example a glove or utility compartment, active bolster may optionally be fitted with a surface treatment or additional finished panel. Referring to FIG. 4, shown is active bolster 22 implemented in the construction of a glove compartment door 66. In this configuration, active bolster 22 if fitted with an additional injection molded panel 68 forming the interior surface of compartment door 66. To maintain a low cross-sectional profile in the finished door assembly, panel 68 is formed such that it conforms closely to the surface features of second body section 30. Panel 68 may also provide convenience features, such as a recessed bin 70 or beverage receptacles (not shown). Panel 68 provides the hardware generally used to mount compartment door 66 to the vehicle, including but not limited to at least one hinge 72, a door latching mechanism (not shown), and suitable closure stops and/or fit and finish fitments. As such, active bolster 22 may incorporate a shape or configuration necessary to accommodate such hardware. Panel 68 is affixed to active bolster 22 using any suitable mechanism, including but not limited to mechanical fasteners, heat staking and weld/adhesive bonding. For example, where panel 68 is formed from a chemically compatible material with body 26, the assembly may be welded together. Exemplary welding methods include infrared (IR) heating, hot plate welding, radio frequency heating, vibration welding, induction welding, ultrasonic welding and subsonic welding. In one exemplary embodiment, panel 68 is welded to active bolster 22 around at least a portion of the periphery of first body section 28, that is at weld line 74 as detailed in the sectional view of FIG. 5a. To permit for expansion of active bolster 22, the welds on weld line 74 are frangible upon deployment. To maintain panel 68 affixed to active bolster 22 during deployment, additional fastening means are provided, for example non-frangible weld pads 76 provided within the recessed region 42 of panel 68. Suitable weld pads 76 are those that exhibit sufficient holding force so as to maintain panel 68 affixed to second body section 30 during deployment. While four weld pads are shown, a fewer or greater number of weld pads may be used to achieve the desired performance characteristics. While weld pads 76 are exemplified here, it will be appreciated that any suitable fastening means may be used, including but not limited to mechanical fasteners, adhesives and other welding arrangements. It will also be appreciated that in other embodiments, panel 68 is attached to active bolster 22 solely through the weld pads or equivalent non-frangible fastening means, that is without the frangible weld around the periphery of the device. Opposite panel 68, that is on the exterior surface 78 of first body section 28 a suitable surface treatment may be applied or formed on injection molding to achieve the desired appearance characteristics of color, grain, gloss, fit and finish.

Figure 5A:
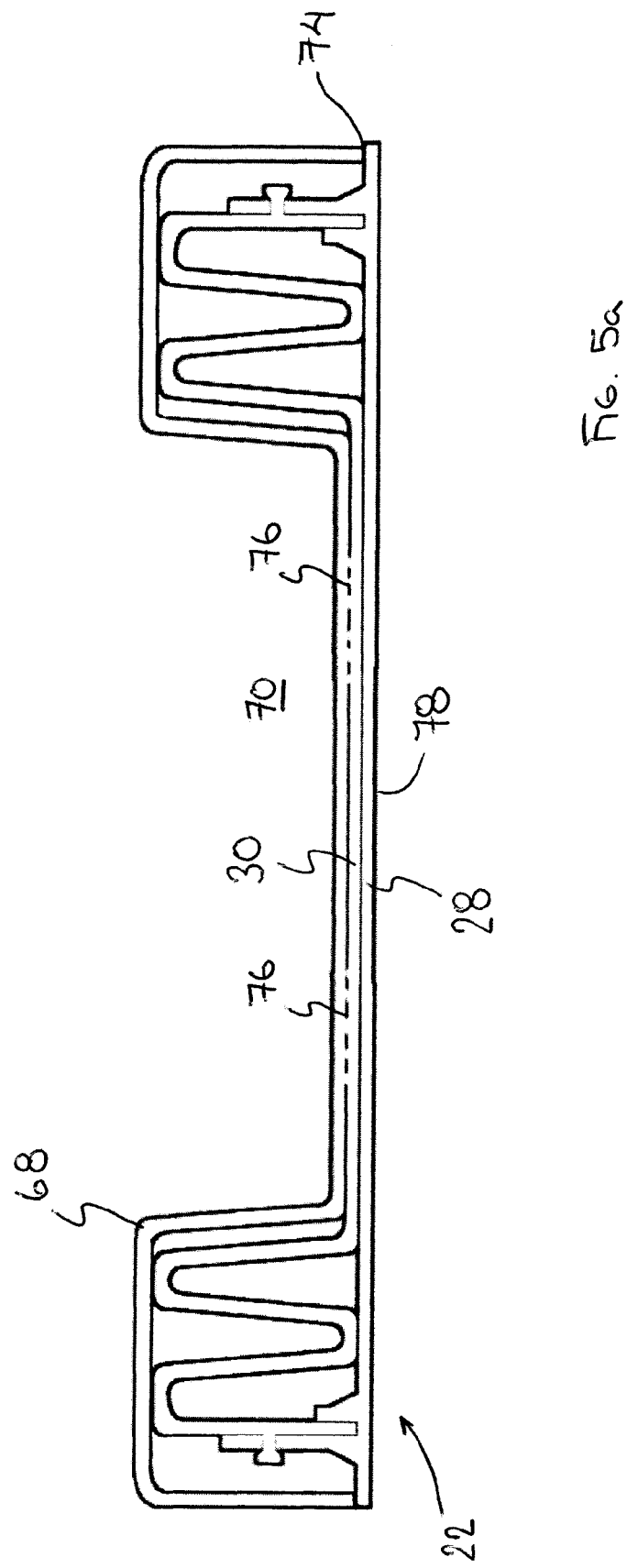
FIG. 5a is a side sectional view of the active bolster system of FIG. 4 in an un-deployed state.
Figure 5B:
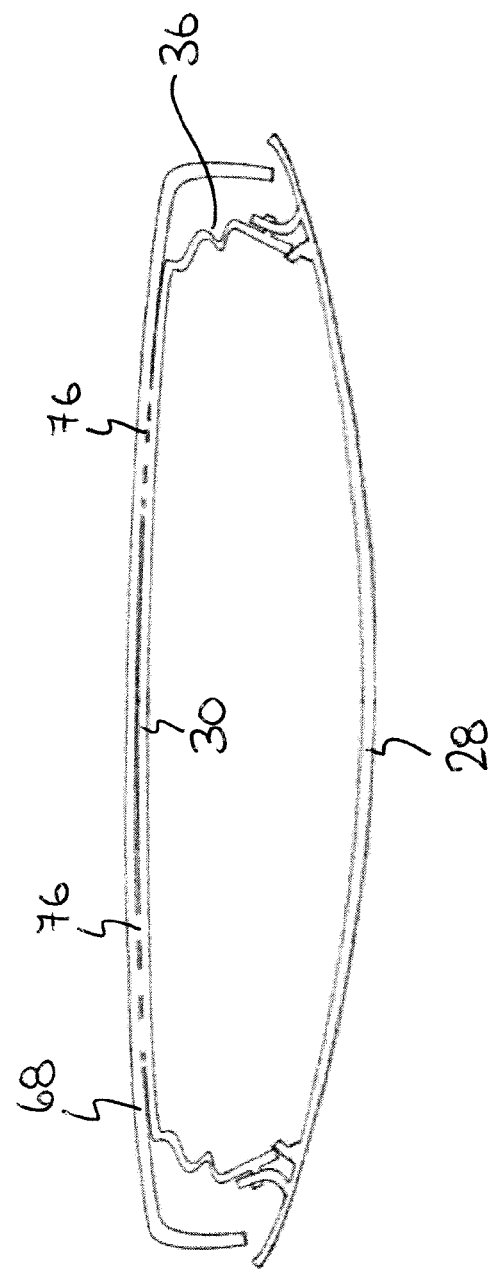
FIG. 5b is a side sectional view of the active bolster system of FIG. 4 in a deployed state.

In use, that is during deployment of active bolster 22 during a crash event, inflator 62 pressurizes body 26, in particular hollow chamber 34 to cause an unfolding or deformation of pleat 36. This volumetric expansion of hollow chamber 34 projects the outer surface of first body section 28 of active bolster 22 outwardly to the extended position, as shown in FIG. 5b, thereby positioning closer to or substantially adjacent the vehicle occupant, and providing increased energy absorption capability compared to a non-expanded bolster. The breakage of frangible weld line 74 detailed in FIG. 5a is shown, allowing active bolster unobstructed expansion during deployment. Thus, the outer surface of active bolster 22 is in position to engage a targeted body portion of the occupant to increase the duration of deceleration during vehicle deceleration.

Figure 6B:
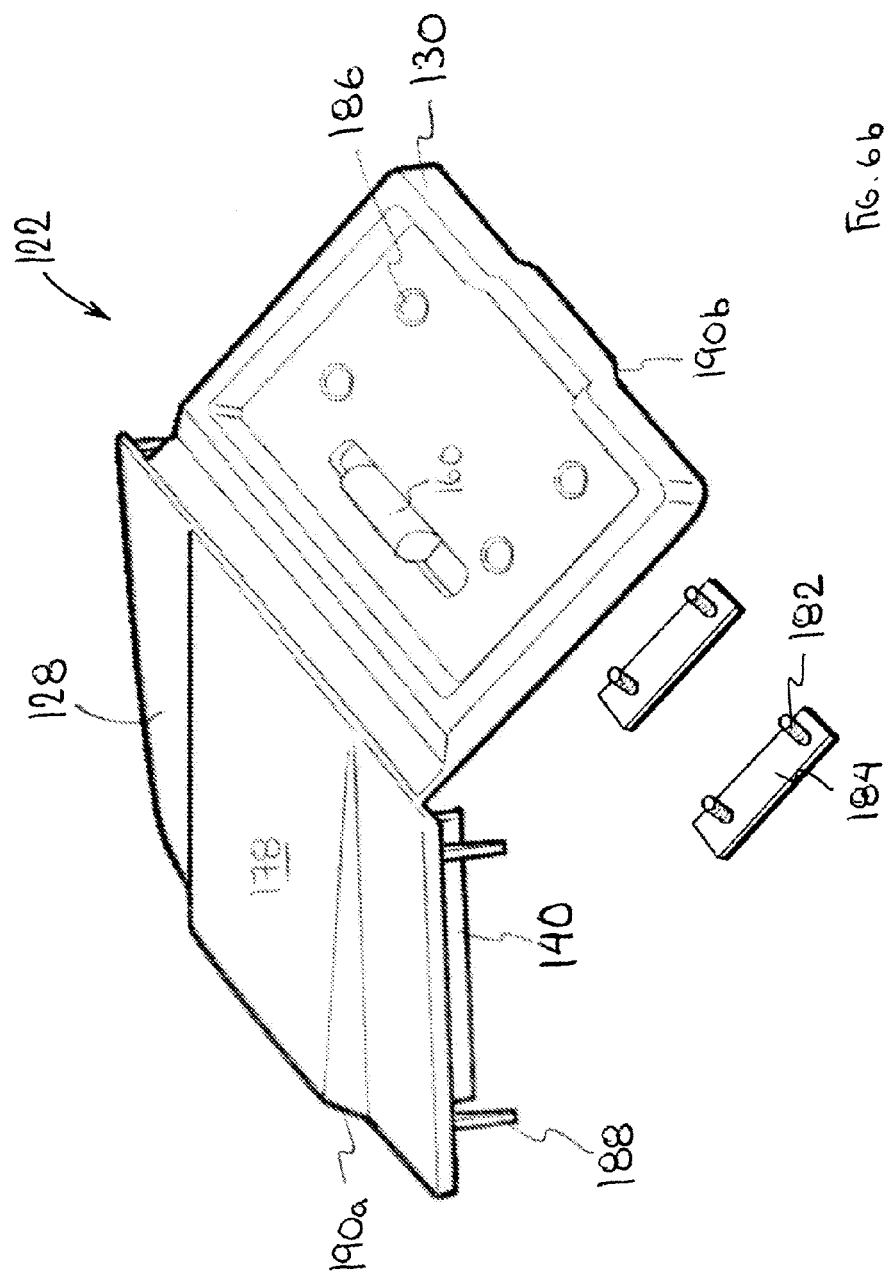

An alternate embodiment of active bolster, denoted 122, is shown in FIGS. 6a to 6c. Active bolster 122 is constructed substantially as described in relation to the embodiment represented in FIGS. 2 to 3c. For sake of clarity, only primary differences will be noted below, and where parts are discussed, parts similar or identical to parts in the previous embodiment are identified by like numbers, increased by 100. In this embodiment, active bolster 122 is configured for use in a fixed interior panel assembly, namely as a driver active knee bolster. As in the previous embodiment, active bolster 122 comprises an injection molded body 126 having a first body section 128 and a second body section 130, first and second body sections 128, 130 being interconnected through a living hinge 132. In an assembled and readied state, first and second body sections 128, 130 are folded into a closed configuration, thereby defining a hollow chamber, similar to that detailed in FIG. 3b. In the embodiment shown, the inside surface of first body section 128 provides primary projection element 140 and secondary projection element 142 for mating engagement with second body section 130, again similar to that explained for the previous embodiment, and detailed in FIG. 3b. As previously indicated, it will be appreciated that the use of projection elements is merely exemplary, and that other closure means, for example as detailed in FIG. 3d may be used. Inflator 162 is positioned in a housing 160 provided in second body section 130 so as to be in direct fluid communication with the hollow chamber provided between first and second body sections 128, 130.

To facilitate mounting of active bolster within a vehicle, prior to folding first and second body section together, suitable mounting elements are provided on the interior surface 180 of second body section 130, as shown in FIGS. 6b and 6c. As will be appreciated, a variety of mounting element configurations may be implemented. In the embodiment shown, one or more threaded fasteners 182 provided on respective mounting strips 184 are located on second body section 130, with threaded fasteners 182 extending outwardly through corresponding holes 186, thereby being exposed on the mounting surface of active bolster 122. Threaded fasteners 182 serve to securely fasten active bolster 122 to a corresponding reaction surface or vehicle frame structure with sufficient holding force to maintain it in position during an impact event. Active bolster 122 also provides one or more fitment towers 188, or suitable equivalent structures such as tabs, to further facilitate alignment and attachment of active bolster 122 to a vehicle. As will be appreciated, the configuration of the fitment towers 188 will vary, and will ultimately depend on the corresponding receptacle provided on the vehicle dash assembly. As further noted in this embodiment, active bolster 122 is shaped to accommodate a vehicle steering column. As such, both first and second body sections 128, 130 are injection molded with a corresponding contour 190a, 190b such that on folding the sections together, a substantially sealed hollow chamber is obtained. On the exposed exterior surface 178 of first body section 128 a suitable surface treatment may be applied or formed on injection molding to achieve the desired appearance characteristics of color, grain, gloss, fit and finish.

In active bolster 22 detailed in FIG. 4, second body section 30 provides a support surface for panel 68 which in turn by way of hinge 72 and corresponding latch mechanism (not shown) is coupled to the vehicle. In active bolster 122 detailed in FIG. 6c, second body section 130 provides a support surface that is directly coupled to the vehicle by way of suitable mounting hardware. As will be appreciated, regardless of whether or not an intermediate structure is present (e.g. panel 68), second body section 30 provides the support surface that couples the active bolster either directly or indirectly to the vehicle.

Figure 7:
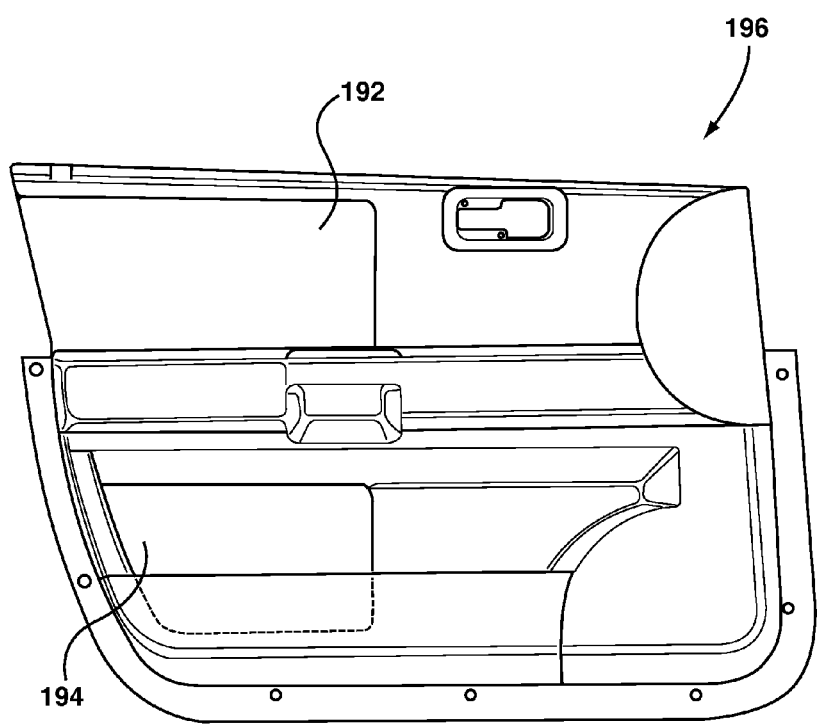
FIG. 7 is a side view of a door panel assembly showing the placement of side bolster assemblies according to a further exemplary embodiment.

The active bolster described herein is suitable for use in a wide range of locations within a vehicle passenger compartment. In addition to usage as a knee bolster, as generally described above, the active bolster is configurable for use in side bolster applications. For example, the active bolster may be implemented in the form of an upper active side bolster 192 or a lower active side bolster 194 within a side door panel 196, as detailed in FIG. 7. Upper active side bolster 192 would assist in protecting the thorax region of the occupant, while lower active side bolster 194 is directed to protecting the occupant pelvis region, in the event of a side impact event. As will be appreciated, still further applications and implementations of an active bolster are possible, with the above non-limiting embodiments being merely exemplary. For example, the active bolster may be used in another type of vehicle, including, but not limited to, other on-road motor vehicles, off-road vehicles, trucks, buses, vans, trains, airplanes, marine vehicles, or amusement rides.

As will be appreciated, although the components of the active bolster, in particular the expansible body and related panels (where provided) are described as being injection molded, the components may be formed using any other suitable process. Materials suitable for the expansible body include, but are not limited to polyolefin with elastic properties suitable for deployment over a range of operating temperatures, such as Salflex 245 (Salflex Polymers, Toronto, ON). Non-expanding components (e.g. panel 68) may be formed from filled or unfilled thermoplastic material such as, but not limited to polypropylene, thermoplastic elastomer polyolefin (TPO), acrylonitrile butadiene styrene (ABS) or polycarbonate (PC)/ABS blends. Non-expanding components may also be selected from non-polymeric materials, such as various metal substrates and/or fiberglass.

As will be appreciated, while the embodiments presented herein present the accordion pleats as having a certain configuration/orientation, they may be configured differently depending on the application. In other words, the pleats may be different in number, orientation, take a different form or be continuous/dis-continuous around the expansible body, as deemed suitable for a certain active bolster configuration. For example, in other exemplary embodiments, the pleats may be configured as having sine curve or rectangular cross-section shape. In other exemplary embodiments, the number of pleats may differ (e.g. one pleat, five pleats, or varying the number of pleats at different locations).

It will be further appreciated that active bolster characteristics may be controlled or influenced in a number of ways, such as through the use of vents (e.g. quantity and placement), selection of materials (e.g. types, combinations, thickness, amount), pleats (e.g. number, location, or shape), inflator (e.g. type, discharge rate, discharge volume), structural features (e.g. ribs, or other integrated patterns) or any combination thereof.

While various embodiments according to the present invention have been described above, it should be understood that they have been presented by way of illustration and example only, and not limitation. It will be apparent to persons skilled in the relevant art that various changes in form and detail can be made therein without departing from the scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other combination. All patents and publications discussed herein are incorporated by reference herein in their entirety.

The invention claimed is:

1. An inflatable active bolster for a vehicle occupant, the inflatable active bolster comprising:
    an expansible hollow chamber of unitary construction having a first body section and a second body section interconnected by a living hinge, said first and second body sections being folded about said living hinge and joined about at least a portion of the periphery between said first and second body section, to form said hollow chamber;
    said first body section having an outer surface for facing the vehicle occupant;
    said second body section providing a support surface for coupling the inflatable active bolster to a vehicle;
    wherein at least one of said first body section and said second body section has at least one expansible element such that upon pressurization of said expansible hollow chamber, at least a portion of said at least one expansible element undergoes deformation to permit inflation of said expansible hollow chamber, displacing said outer surface of said first body section outwardly to an extended position.

2. The inflatable active bolster of claim 1, wherein said at least one expansible element is formed in said second body section about at least a portion of the periphery of said second body section.

3. The inflatable active bolster of claim 2, wherein said expansible element is formed as a pleat.

4. The inflatable active bolster of claim 1, wherein said second body section is provided with a recessed mid-portion that is positioned at least in close proximity to said first body section, thereby reducing the volume of said expansible hollow chamber.

5. The inflatable active bolster of claim 1, wherein said second body section is permanently joined to said first body section by way of welding around at least a portion of said periphery.

6. The inflatable active bolster of claim 1, wherein said first body section is provided with at least one projection element extending from an inside surface proximal the outer perimeter, said projection element providing a surface to permanently join with said second body section.

7. The inflatable active bolster of claim 6, wherein two projection elements are provided on said first body section, said two projection elements defining a channel configured to receive a peripheral region of second body section, said peripheral region being permanently joined to at least one of said two projection elements.

8. The inflatable active bolster of claim 7, wherein said second body section is permanently joined to at least one of said two projection elements on said first body section by heat staking.

9. The inflatable active bolster of claim 1, wherein said second body section includes an integral housing for receiving an inflator.

10. The inflatable active bolster of claim 1, further comprising mounting elements extending outwardly from said second body portion for attachment to the vehicle.

11. The inflatable active bolster of claim 10, wherein said mounting elements comprise one or more threaded fasteners provided on respective mounting strips located within said hollow chamber, said threaded fasteners being arranged to extend outwardly from said second body portion for engagement with the vehicle.

12. The inflatable active bolster of claim 11, further comprising one or more additional fitment towers for engaging respective receptacles provided on said vehicle, said fitment towers serving to enhance alignment between said inflatable active bolster and said vehicle.

13. The inflatable active bolster of claim 1, further comprising a panel to substantially cover said second body section, said panel providing at least one mounting element to mount said inflatable active bolster to the vehicle, said panel being joined to said inflatable active bolster through at least one permanent joint between said panel and said second body section.

14. The inflatable active bolster of claim 13, wherein said active bolster is in the form of a glove compartment door, and said at least one mounting element is a hinge for permitting opening/closing of said door.

15. The inflatable active bolster of claim 13, wherein at least a portion of a peripheral region of said panel is joined to the outer periphery of said first body section by a frangible weld joint that is breakable upon deployment of the inflatable active bolster.

16. The inflatable active bolster of claim 1, wherein said hollow chamber is formed of a polymeric material through injection molding.

17. An injection molded inflatable active bolster for a vehicle occupant that projects outwardly from a stored position to an extended position adjacent the occupant during a collision event, the bolster comprising:
  an expansible hollow chamber of unitary injection molded construction having a first body section and a second body section interconnected by a living hinge, said first and second body sections being folded about said living hinge and joined about at least a portion of the remaining periphery between said first and second body section, to form said hollow chamber;
  said first body section having an outer surface for facing the vehicle occupant;
  said second body section providing a mating surface for attachment of the inflatable active bolster to a vehicle;
  an inflator in fluid communication with said expansible hollow chamber,
said second body section having at least one expansible element such that upon pressurization of said expansible hollow chamber by said inflator, at least a portion of said at least one expansible element undergoes deformation to permit inflation of said expansible hollow chamber, displacing said outer surface of said first body section outwardly to an extended position.

* * * * *